(12) United States Patent
Ni et al.

(10) Patent No.: US 12,130,493 B2
(45) Date of Patent: Oct. 29, 2024

(54) LENS DRIVING DEVICE

(71) Applicant: Changzhou AAC Raytech Optronics Co., Ltd., Changzhou (CN)

(72) Inventors: Tianheng Ni, Shenzhen (CN); Rongfu Xie, Shenzhen (CN); Feng Yan, Shenzhen (CN); Gang Li, Shenzhen (CN); Suohe Wei, Shenzhen (CN)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 507 days.

(21) Appl. No.: 17/521,886

(22) Filed: Nov. 9, 2021

(65) Prior Publication Data

US 2022/0146782 A1    May 12, 2022

(30) Foreign Application Priority Data

Nov. 11, 2020    (CN) .......................... 202022596172.3

(51) Int. Cl.
*G02B 7/00* (2021.01)
*G02B 7/08* (2021.01)
*G02B 27/64* (2006.01)

(52) U.S. Cl.
CPC ............. *G02B 7/08* (2013.01); *G02B 27/646* (2013.01)

(58) Field of Classification Search
CPC ........ G02B 7/08; G02B 27/646; G02B 7/023; G11B 7/0908; G11B 7/0925; G11B 7/0927; G11B 7/0929; G11B 7/093; G11B 7/0937; H02K 41/0354; H02K 41/0356
USPC ........................................................ 359/824
See application file for complete search history.

(56) References Cited

U.S. PATENT DOCUMENTS

| | | | | |
|---|---|---|---|---|
| 11,962,883 B2* | 4/2024 | Sugiura | ................... | G02B 7/023 |
| 2022/0070346 A1* | 3/2022 | Wade | ..................... | H04N 23/55 |

* cited by examiner

*Primary Examiner* — Henry Duong
(74) *Attorney, Agent, or Firm* — W&G Law Group

(57) ABSTRACT

A lens driving device includes a lens module, a first support frame, a second support frame sleeved on the first support frame, a support assembly for suspending the first support frame inside the second support frame, a first flexible printed circuit board (PCB) including folding portions, a second flexible PCB opposite to and independent from the first flexible PCB, and a driving assembly. Each folding portion includes a first fixing portion attached to the first support frame, a second fixing portion attached to the shell, and bent portions connecting the first fixing portion with the second fixing portion by bending. The two flexible PCBs are separately provided in the lens driving device to prevent the risk of disengagement when the two flexible PCBs move, and the folding portions prevent the first flexible PCB from being pulled by the movement of the lens module to be disconnected.

10 Claims, 10 Drawing Sheets

LENS DRIVING DEVICE

TECHNICAL FIELD

The present disclosure relates to the technical field of photographing apparatus, and in particular, to a lens driving device.

BACKGROUND

Lens driving devices are devices that are used to drive lenses in apparatus with shooting functions to perform autofocusing. The apparatus can be digital cameras, digital video cameras, smart phones, tablet computers, etc. The lens driving devices have been widely used.

A first flexible printed circuit board and a second flexible printed circuit board of the lens driving device in the related art are directly welded into one piece. Such configuration only causes a complicated process, but also has a relatively high requirement for the bonding position of the printed circuit board. The lens driving device is prone to occur de-binding during its movement and thus unable to work. Since the folded portion of the flexible printed circuit board needs to be placed on the side of the product during design, the folded portion can occupies a large space and thus requires additional storage space, which is not conducive to product stacking under various shooting scenes.

Therefore, it is necessary to provide a lens driving device to solve the above problems.

SUMMARY

The present disclosure provides a lens driving device, which aims to solve the problem in the lens driving device in the related art that two flexible printed circuit boards welded into one piece are prone to be disengaged during the movement, and the folding portion occupies a larger space.

The present disclose provides a lens driving device. The lens driving device include:
  lens module;
  a first support frame configured to accommodate and carry the lens module;
  a second support frame sleeved on the first support frame and spaced apart from the first support frame;
  a support assembly configured to suspend the first support frame inside the second support frame in such a manner that the first support frame is rotatable relative to the second support frame about a first axis or a second axis, where the support assembly is rotatably connected to the first support frame along the first axis and rotatably connected to the second support frame along the second axis, and the first axis and the second axis are both perpendicular to an optical axis of the lens module;
  a shell covering the second support frame;
  a first flexible printed circuit board surrounding two adjacent sidewalls of the first support frame, where the first flexible printed circuit board includes folding portions that respectively correspond to the two adjacent sidewalls of the first support frame, where each of the folding portions includes a first fixing portion attached to the first support frame, a second fixing portion attached to the shell, and bent portions connecting the first fixing portion with the second fixing portion by bending, where the bent portions are compressed or stretched with a movement of the first support frame;
  a second flexible printed circuit board surrounding another two adjacent sidewalls of the second support frame, where the second flexible printed circuit board and the first flexible printed circuit board are opposite to and independent from each other; and
  a driving assembly including a first driving assembly and a second driving assembly, where the first driving assembly is configured to drive the first support frame to rotate relative to the second support frame about the first axis or the second axis; the second driving assembly is configured to drive the lens module to move along the optical axis; and one of the first driving assembly and the second driving assembly is electrically connected to the first flexible printed circuit board, and the other one of the first driving assembly and the second driving assembly is electrically connected to the second flexible printed circuit board.

As an improvement, the support assembly includes a support member, two first guiding posts, and two second guiding posts. The support member includes a support plate, first support walls, and second support walls. The two first support walls are respectively bent and extend from two ends of the support plate along the first axis and are spaced apart from the first support frame. The two second support walls are respectively bent and extend from two ends of the support plate along the second axis and are spaced apart from the first support frame. The two first guiding posts are separately disposed at two ends of the first support frame along the first axis and spaced apart from each other, and the two second guiding posts are disposed at two ends of the first support frame along the second axis and spaced apart from each other. The support plate is located on top of the lens module and spaced apart from the lens module. The first support walls are rotatably connected to the first support frame through the two first guiding posts, respectively. The second support walls are rotatably connected to the second support frame through the two second guiding posts, respectively, and are spaced apart from the first support frame.

As an improvement, the first driving assembly includes two first coils and two first magnet. The two first coils are disposed on the first flexible printed circuit board along a direction perpendicular to the optical axis, and are located at positions corresponding to the two adjacent sidewalls of the first support frame, respectively. The two first magnets are respectively disposed at positions corresponding to the two adjacent sidewalls of the first support frame along the direction perpendicular to the optical axis. Each of the two first magnets is opposite to and spaced apart from one of the two first coils, and one of the two first magnet and one of the two first coil jointly drive the first support frame to rotate relative to the second support frame about the first axis or the second axis. The second driving assembly includes two second coils and two second magnets. The two second coils are disposed on the second flexible printed circuit board along the direction perpendicular to the optical axis, and are located at positions corresponding to another two adjacent sidewalls of the first support frame, respectively. The two second magnets are respectively disposed at positions corresponding to another two adjacent sidewalls of the first support frame along the direction perpendicular to the optical axis. Each of the two second magnets is opposite to and spaced apart from one of the two second coils, and one of the two second magnets and one of the second coils jointly drive the lens module to move along the optical axis.

As an improvement, the first flexible printed circuit board further includes a base portion, a first connecting portion, and a first extending portion. The base portion is disposed at a bottom end of the first support frame, and is connected to one of the first fixing portions located on one side of the first support frame. The first connecting portion is configured to connect one of the second fixing portions located on one side of the first support frame 1 with another one of the first fixing portions located on another side of the first support frame. The first extending portion extends from another one of the second fixing portions toward the shell.

As an improvement, a fixing member is provided in a bent area of the bent portions to ensure a shape of the first flexible printed circuit board.

As an improvement, the first support frame is provided with first attachment grooves at positions corresponding to the first fixing portions, and each of the first fixing portions is attached to one of the first attachment grooves.

As an improvement, the second support frame is provided with avoidance portions at positions corresponding to the bent portions to avoid the bent portions.

As an improvement, the second flexible printed circuit board includes third fixing portions respectively attached to two adjacent sides of the second support frame, a second connecting portion configured to connect the third fixing portions located at the two adjacent sides of the second support frame, and a second extending portion extends from one of the third fixing portions toward the shell.

As an improvement, the second support frame is provided with second attachment grooves at positions corresponding to the third fixing portions, and each of the third fixing portions is attached to one of the second attachment grooves.

As an improvement, the bent portions include at least two bent portions sequentially connected to one of the first fixing portions and one of the second fixing portions.

Compared to the prior art, in the lens driving device provided by the present disclosure, the first flexible printed circuit board is disposed on the two adjacent sidewalls of the first support frame, then the second flexible printed circuit board is disposed on the two adjacent sidewalls of the second support frame, and the first flexible printed circuit board and the second flexible printed circuit board are independently arranged and opposite to each other. The two flexible printed circuit boards according to the present disclosure can be separately provided while meeting the requirements of double flexible printed circuit boards, which avoid the risk of welding disengagement and inoperability during the movement of the lens driving device. The first flexible printed circuit board is provided with the folding portions so that the movement of the lens module can be buffered to prevent the first flexible printed circuit board from being pulled by the movement of the lens module to be damaged. The two sides of each folding portion are respectively attached to the first support frame and the shell, so that it is unnecessary to provide additional space for placing the folding portions to reduce the occupied space for the folding portions and facilitate product stacking in a multi-shot scenario.

BRIEF DESCRIPTION OF DRAWINGS

In order to more clearly describe the technical solutions in the embodiments of the present disclosure or the related art, the following will briefly describe the drawings used in the description of the embodiments of the present disclosure or the related art. It is apparent that the drawings in the following description merely illustrate some embodiments of the present disclosure. Those skilled in the art can obtain other drawings based on these drawings. In the drawings.

Figure 1:
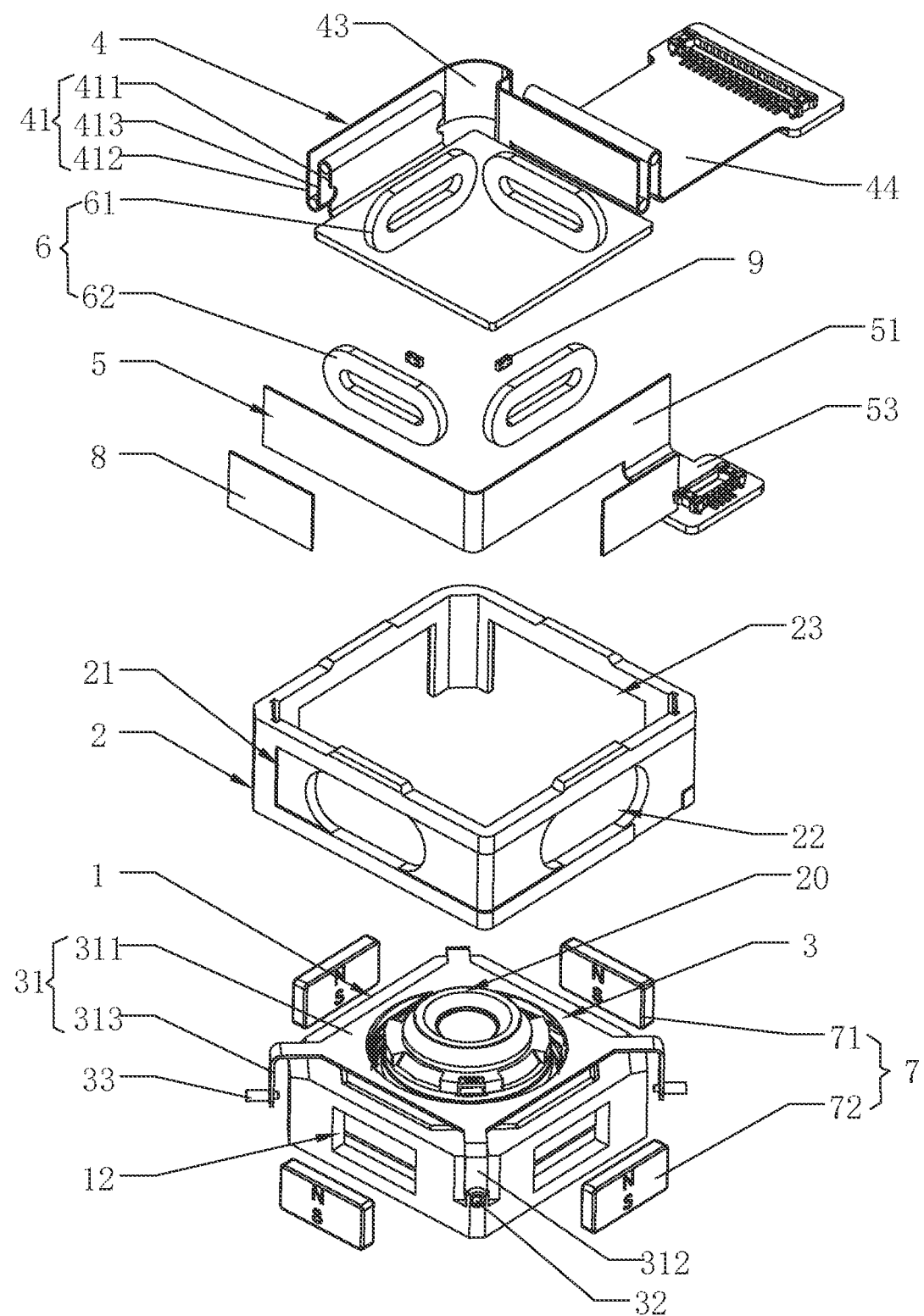
FIG. 1 is a schematic exploded view showing a structure of a lens driving device of an embodiment of the present disclosure.

DESCRIPTION OF REFERENCE NUMERALS 1. first support frame; 11. first attachment groove; 12. mounting groove;
2. second support frame; 21. second attachment groove; 22. avoidance groove; 23. avoidance portion;
3. support assembly; 31. support member; 311. support plate; 312. first support wall; 313. second support wall; 32. first guiding post; 33. second guiding post;
4. first flexible printed circuit board; 41. folding portion; 411. first fixing portion; 412. second fixing portion; 413. bent portion; 42. base portion; 43. first connecting portion; 44. first extending portion; 45. fixing member;
5. second flexible printed circuit board; 51. third fixing portion; 52. second connecting portion; 53. second extending portion;
6. coil assembly; 61. first coil; 62. second coil;
7. magnet assembly; 71. first magnet; 72. second magnet;
8. metal sheet;
9. Hall sensor;
20. lens module;
30. shell.

DESCRIPTION OF EMBODIMENTS

In order to clearly understand the purpose, technical solutions and advantages of the present disclosure, the following further describes the present disclosure in detail with reference to the drawings and embodiments. It should be understood that the specific embodiments described herein merely intend to explain the present disclosure, but cannot be construed as limitations on the present disclosure.

Figure 2:
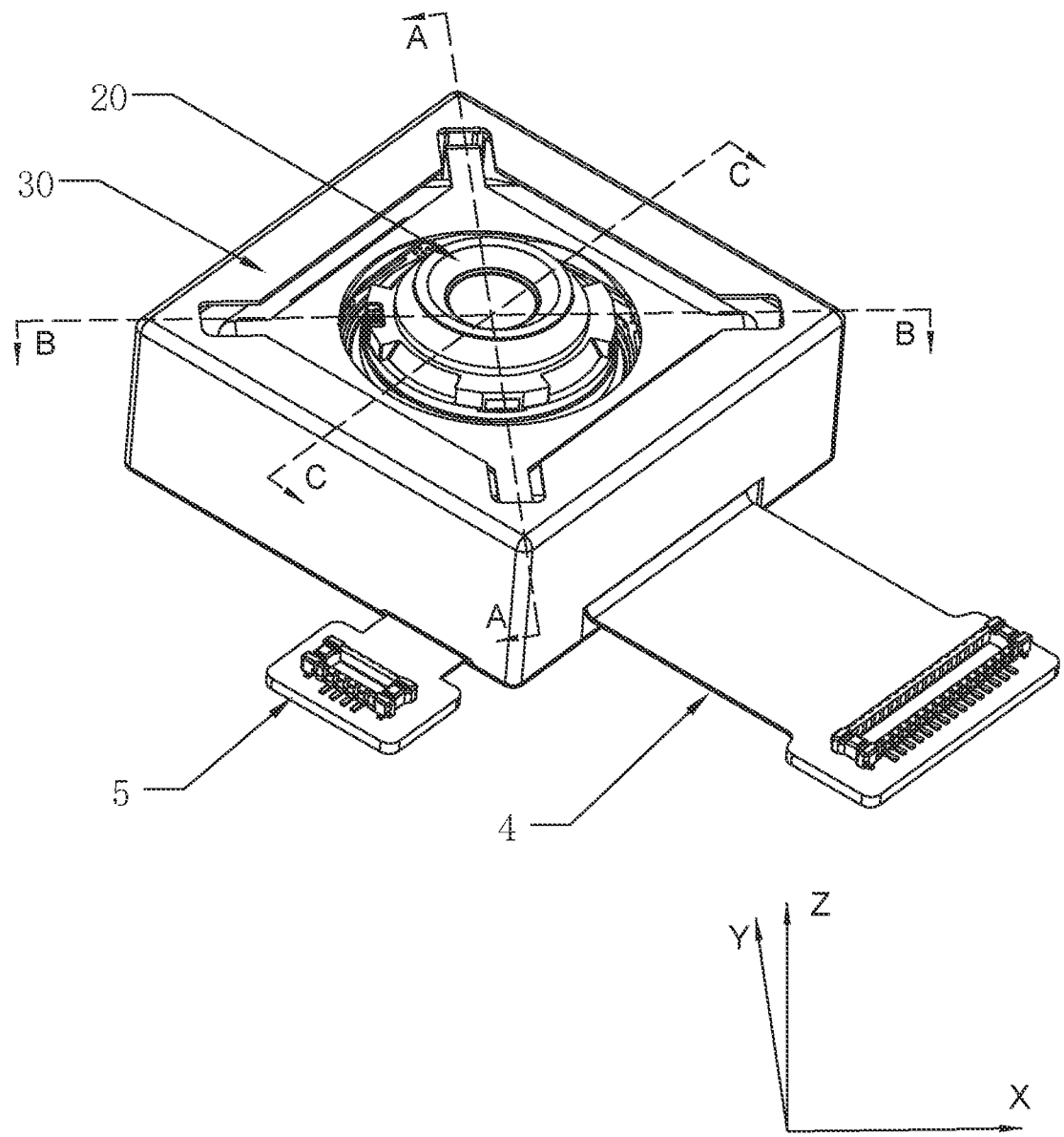
FIG. 2 is a schematic respective view showing a structure of a lens driving device of an embodiment of the present disclosure.
Figure 3:
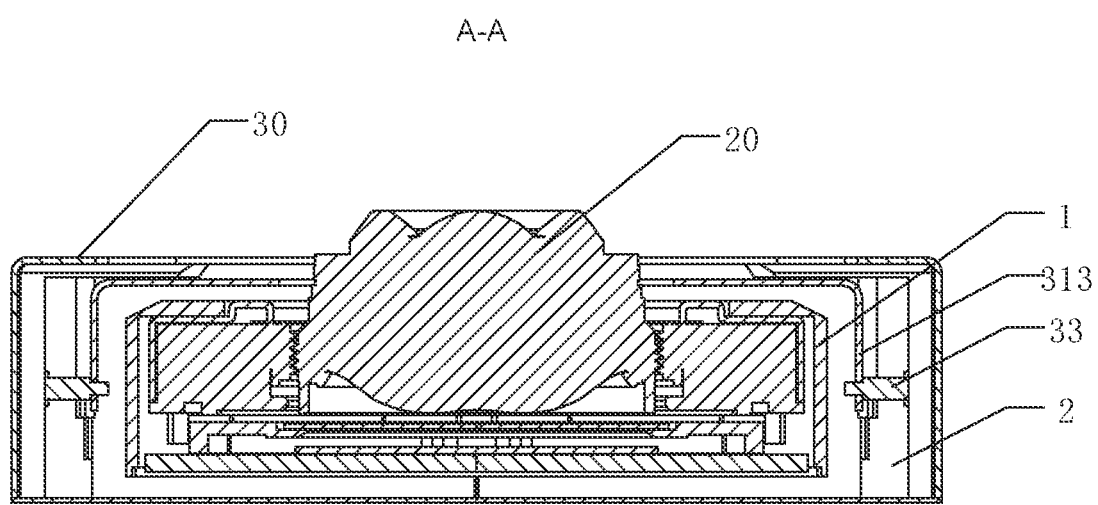
FIG. 3 is a cross-sectional view along line A-A shown in FIG. 2.
Figure 4:
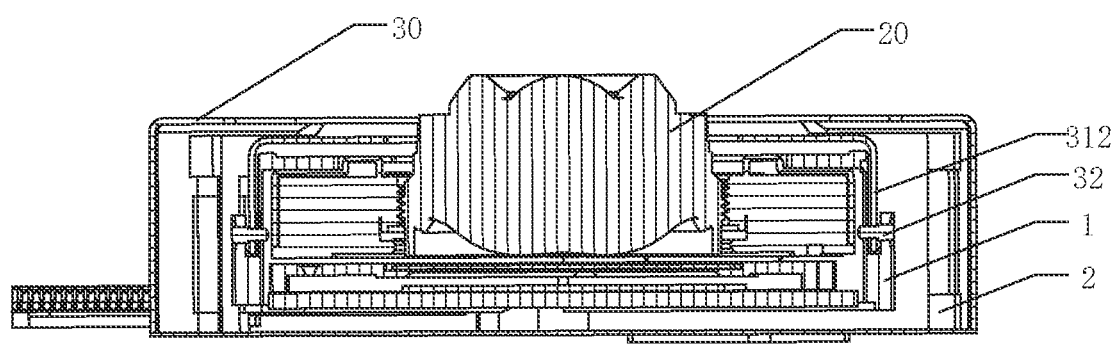
FIG. 4 is a cross-sectional view along line B-B shown in FIG. 2.
Figure 5:
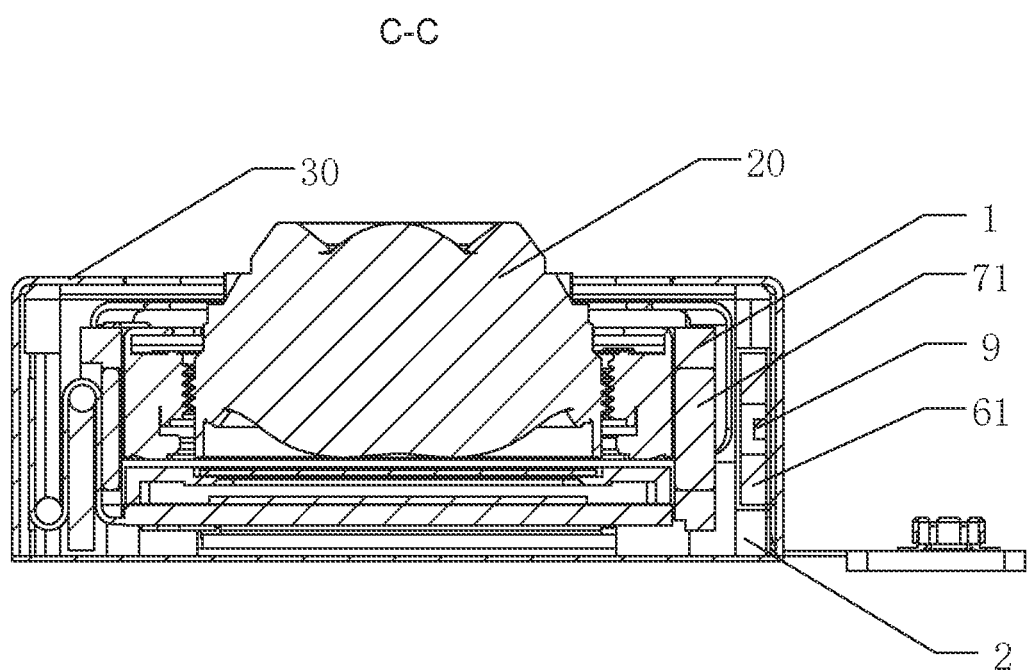
FIG. 5 is a cross-sectional view along line C-C shown in FIG. 2.
Figure 6:
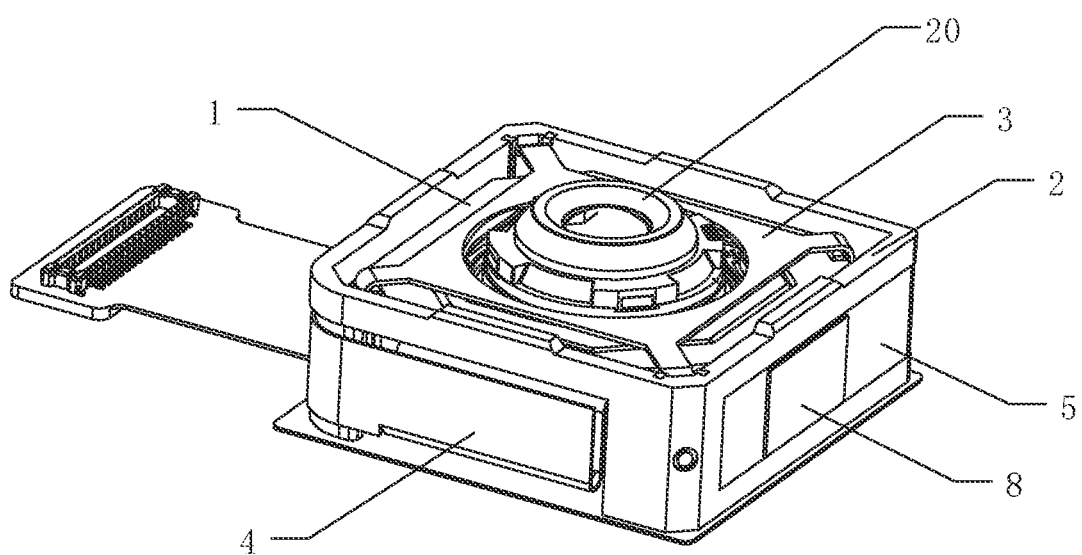
FIG. 6 is a schematic structural view of a lens driving device of an embodiment of the present disclosure, in which the shell is removed.
Figure 7:
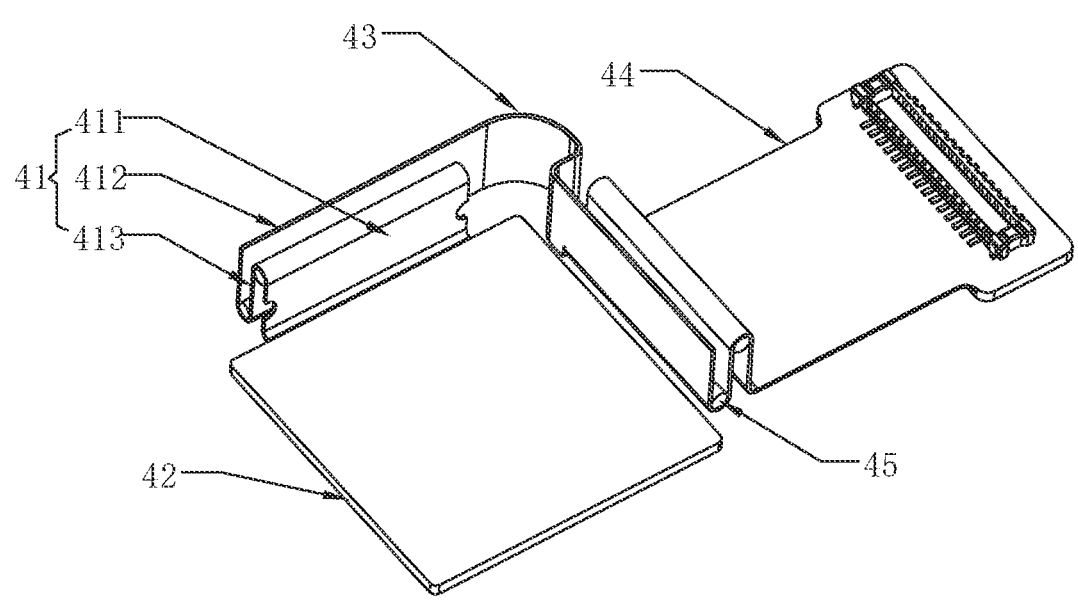
FIG. 7 is a schematic structural view of a first flexible printed circuit board in a lens driving device of an embodiment of the present disclosure.
Figure 8:
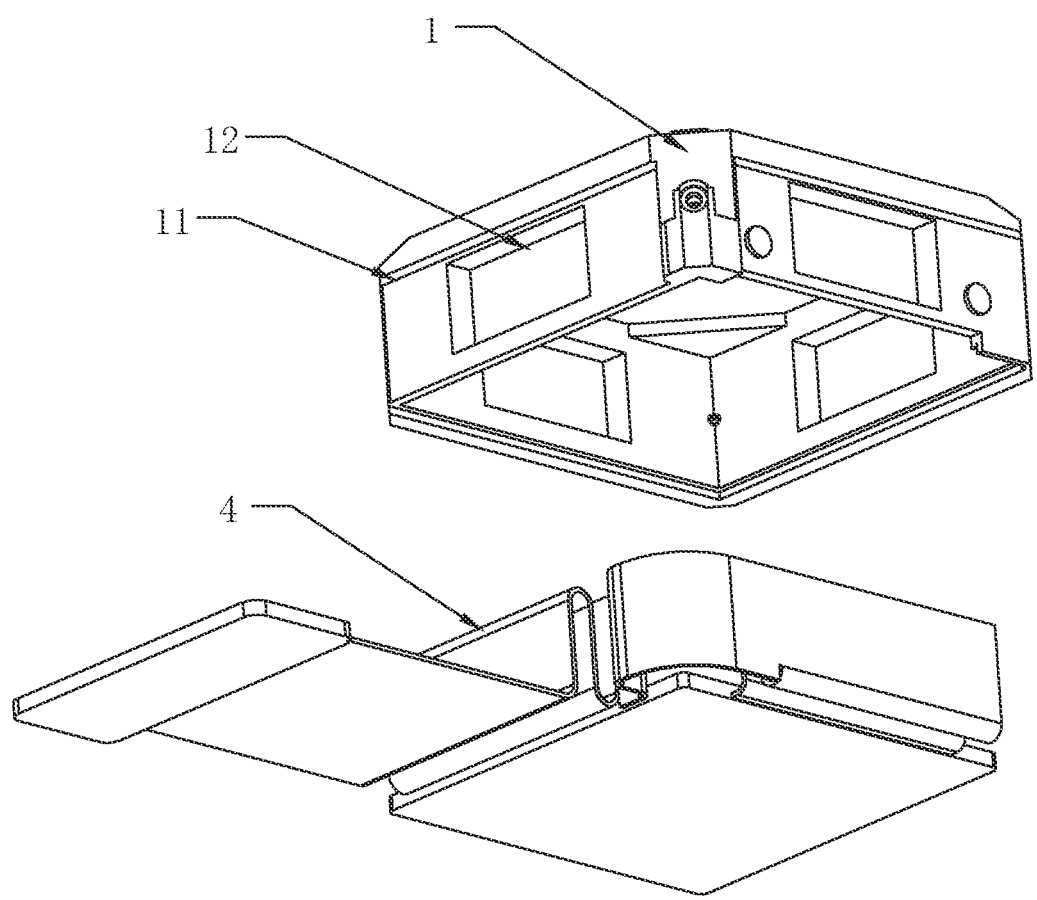
FIG. 8 is a schematic structural view of a first flexible printed circuit board and a first support frame in a lens driving device of an embodiment of the present disclosure.
Figure 9:
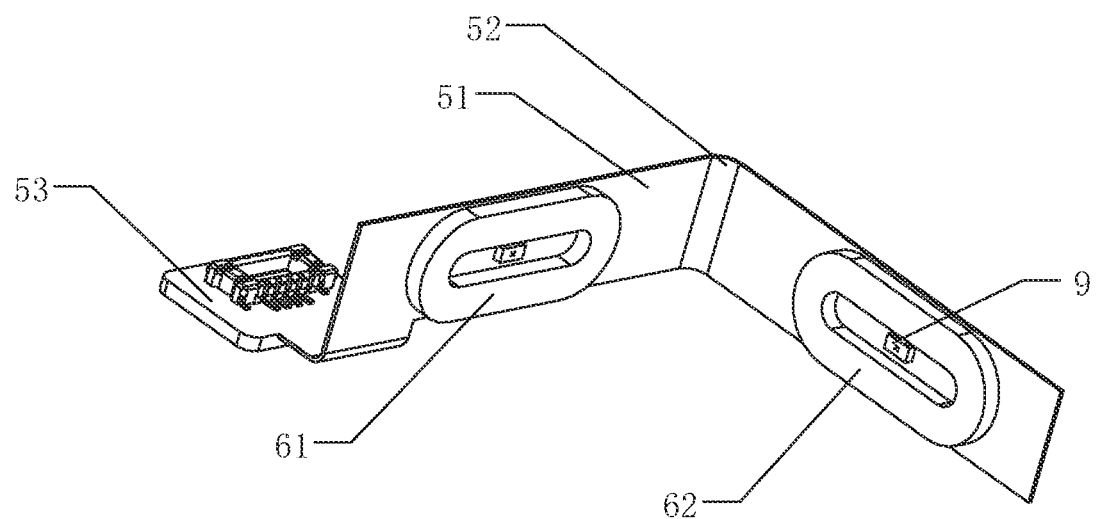
FIG. 9 is a schematic structural view of a second flexible printed circuit board and a part electrically connected to the second flexible printed circuit board in a lens driving device of an embodiment of the present disclosure.
Figure 10:
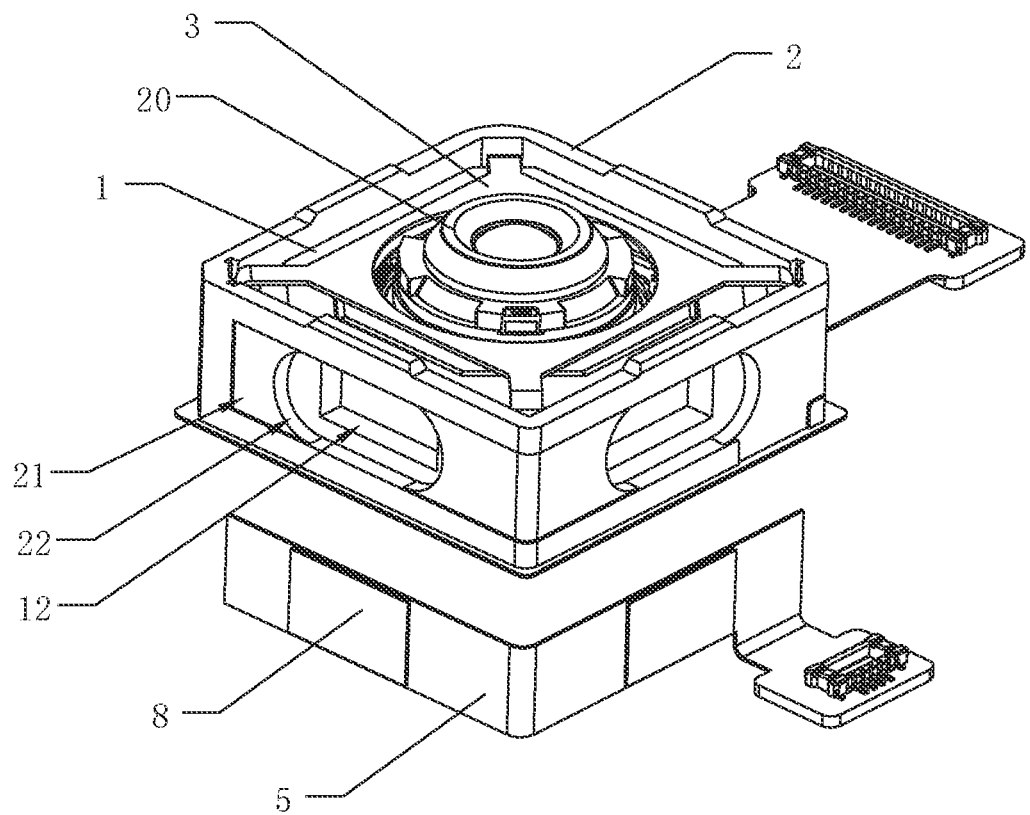
FIG. 10 is a schematic diagram of a lens driving device of an embodiment of the present disclosure, in which a partial structure is removed.

An embodiment of the present disclosure provides a lens driving device. Referring to FIG. 1 to FIG. 10, the lens driving device includes a lens module 20, a first support frame 1, a second support frame 2, a support assembly 3, a shell 30, a first flexible printed circuit board 4, a second flexible printed circuit board 5, and a driving assembly.

In an embodiment, the first support frame 1 has a rectangular body structure with a receiving space, and the receiving space is used to install the lens module 20.

In an embodiment, the second support frame 2 has a rectangular box structure, is sleeved on the first support frame 1, and is spaced apart from the first support frame 1.

In some embodiments, the first support frame 1 and the second support frame 2 can be cylindrical structures, trapezoidal body structures or the like according to actual requirements.

In an embodiment, the support assembly 3 is configured to suspend the first support frame 1 inside the second support frame 2 so that the first support frame 1 is rotatable relative to the second support frame 2 about a first axis or a second axis. The support assembly 3 is rotatably connected to the first support frame 1 along the first axis, and is rotatably connected to the second support frame 2 along the second axis. The first axis and the second axis are both perpendicular to an optical axis of the lens module 20, and are parallel to two diagonal directions of the first support frame 1, respectively.

In this embodiment, the first axis can be referred to as a first axis line, and the second axis can be referred to as a second axis line. The first axis line and the second axis line are virtual axis about which the first support frame 1 rotates. The direction of the first axis is defined as an X direction, the direction of the second axis is defined as a Y direction, and the direction of the optical axis of the lens module 20 is defined as a Z direction. The first axis is parallel to the X direction, and the second axis is parallel to the Y direction.

In an embodiment, the support assembly 3 includes a support member 31, first guiding posts 32, and second guiding posts 33. The support member 31 includes a support plate 311 in a rectangular ring shape, first support walls 312, and second support walls 313. The first support walls 312 are respectively bent and extend from two ends (i.e., one pair of diagonal positions) of the support plate 311 along the first axis, and are spaced apart from the first support frame 1. The second support walls 313 are respectively bent and extend from two ends (i.e., another pair of diagonal positions) of the support plate 311 along the second axis, and are spaced apart from the first support frame 1. The first guiding posts 32 include two first guiding posts that are disposed at two ends (i.e., one pair of diagonal positions) of the first support frame 1 along the first axis and that are spaced apart from each other. The second guiding posts 33 include two second guiding posts that are disposed at two ends (i.e., another pair of diagonal positions) of the first support frame 1 along the second axis and that are spaced apart from each other. The support plate 311 is located on top of the lens module 20 and spaced apart from the lens module 20. The first support walls 312 are rotatably connected to the first support frame 1 through the first guiding posts 32, respectively, and the second support walls 313 are rotatably connected to the second support frame 2 through the second guiding posts 33, respectively, and are spaced apart from the first support frame 1.

In some embodiments, the support plate 311 can be in a circular ring shape, an elliptical ring shape, a pentagonal ring shape or the like, according to actual requirements.

In an embodiment, the shell 30 covers on the second support frame 2 to protect internal components.

In an embodiment, the first flexible printed circuit board 4 is disposed around two adjacent sidewalls of the first support frame 1.

In an embodiment, the first flexible printed circuit board 4 includes folding portions 41 that are respectively disposed at positions corresponding to the two adjacent sidewalls of the first support frame 1. Each folding portion 41 includes a first fixing portion 411 attached to the first support frame 1, a second fixing portion 412 attached to the shell 30, and bent portions 413 for connecting the first fixing portion 411 with the second fixing portion 412 by bending. The bent portions 413 are compressed or stretched with the movement of the first support frame 1. The first fixing portion 411 and the second fixing portion 412 that are respectively located on both sides of the folding portion 41 are respectively attached to the first support frame 1 and the shell 30 so that it is unnecessary to additionally provide the receiving space for the folding portion 41, thereby reducing the occupying space for the folding portion 41.

In an embodiment, the first flexible printed circuit board 4 further includes a base portion 42, a first connecting portion 43, and a first extending portion 44. The base portion 42 is located at a bottom end of the first support frame 1, and is connected to the first fixing portion 411 located on one side of the first support frame 1. The first connecting portion 43 is configured to connect the second fixing portion 412 located on the one side of the first support frame 1 with the first fixing portion 411 located on the other side of the first support frame 1. The first extending portion 44 is formed by extending from another second fixing portion 412 toward the shell 30.

In an embodiment, the bent portions 413 include at least two bent portions, and the at least two bent portions are sequentially connected to each other and connects the first fixing portion 411 with the second fixing portion 412. In this way, the strength of the folding portion 41 of the first flexible printed circuit board 4 is enhanced, and the surface area of the first flexible printed circuit board 4 is increased.

In an embodiment, fixing members 45 are provided in the bent area of the bent portions 413. In an embodiment, the fixing members 45 are provided at two ends of the bent area, respectively. The fixing members 45 can use glue or a reinforcing plate to ensure that the first flexible printed circuit board 4 is in a fixed shape and has a consistent restoring rigidity.

In an embodiment, the first support frame 1 is provided with first attachment grooves 11 at positions corresponding to the first fixing portions 411, and each first fixing portion 411 is attached to one of the first attachment grooves 11, which can facilitate the attachment of the first fixing portions 411 to increase its stability and reduce the space required for placing the folding portions 41 in the first flexible printed circuit board.

In an embodiment, the second support frame 2 is provided with avoidance portions 23 at positions corresponding to the bent portions 413 to avoid the bent portions 413. In this way, a space for the bent portions 413 can be provided to achieve the avoidance function.

In an embodiment, the second flexible printed circuit board 5 surrounds two adjacent sidewalls of the second support frame 2 and is opposite to the first flexible printed circuit board 4, and the first flexible printed circuit board 4 and the second flexible printed circuit board 5 are independent from each other.

In an embodiment, the second flexible printed circuit board 5 includes third fixing portions 51 respectively attached to two adjacent sides of the second support frame 2, a second connecting portion 52 for connecting the third fixing portions 51 located at the two adjacent sides of the second support frame 2, and a second extending portion 53 formed by extending from one of the third fixing portions 51 toward the shell 30.

In an embodiment, the second supporting frame 2 is provided with second attachment grooves 21 at positions corresponding to the third fixing portions 51, and each third fixing portion 51 is attached to one of the second attachment grooves 21, which can facilitate the attachment of the third fixing portions 51 and increase its stability.

In an embodiment, the driving assembly includes a first driving assembly and a second driving assembly. The first driving assembly drives the first support frame 1 to rotate relative to the second support frame 2 about the first axis or the second axis, and the second driving assembly drives the lens module 20 to move along the optical axis. One of the first driving assembly and the second driving assembly is electrically connected to the first flexible printed circuit board 4, and the other one of the first driving assembly and the second driving assembly is electrically connected to the second flexible printed circuit board 5.

In an embodiment, the first driving assembly includes two first coils 61 and two first magnets 71. The two first coils 61 are respectively disposed on the first flexible printed circuit board 4 along a direction perpendicular to the optical axis and located at positions corresponding to the two adjacent sidewalls of the first support frame 1. The two first magnets 71 are respectively disposed at positions corresponding to the two adjacent sidewalls of the first support frame 1 along the direction perpendicular to the optical axis. Each first magnet 71 is opposite to and spaced apart from one of the two first coils 61, and the first magnet 71 and the first coil 61 drive the first support frame 1 to rotate relative to the second support frame 2 about the first axis or the second axis.

In an embodiment, the two first coils 61 are electrically connected to the first flexible printed circuit board 4 to achieve electrical signal connection.

In an embodiment, each first coil 61 is provided at one of the bent portions 413 of the first flexible printed circuit board 4.

In an embodiment, the second driving assembly includes two second coils 62 and two second magnets 72. The two second coils 62 are respectively disposed on the second flexible printed circuit board 5 along the direction perpendicular to the optical axis and located at positions corresponding to another two adjacent sidewalls of the first support frame 1. The two second magnets 72 are respectively disposed at positions corresponding to another two adjacent sidewalls of the first support frame 1 along the direction perpendicular to the optical axis. Each second magnet 72 is opposite to and spaced apart from one of the two second coils 62, and the second magnet 72 and the second coil 62 drive the lens module 20 to move along the optical axis.

In an embodiment, the two second coils 62 are electrically connected to the second flexible printed circuit board 5 to achieve electrical signal connection.

In an embodiment, the two first coils 61 and the two second coils 62 form a coil assembly 6, and the two first magnets 71 and the two second magnets 72 form a magnet assembly 7.

When one of the first coils 61 are energized to generate a magnetic field, a corresponding one of the first magnets 71 is driven to rotate about the first axis or the second axis. When one of the second coils 62 is energized to generate a magnetic field, a corresponding one of the second magnets 72 is driven to move along the optical axis.

In an embodiment, the second support frame 2 is provided with avoidance grooves 22, each of which is disposed at a position corresponding to the position of one of the second coils 62 on the second flexible printed circuit board 5 to avoid this second coil 62. Such configuration can facilitate the arrangement of the second coils 62, and it is unnecessary to increase the placement space for the second coils 62.

In an embodiment, the first support frame 1 is provided with mounting grooves 12 at positions corresponding to the first magnets 71 and the second magnets 72. First magnet 71 and the second magnets 72 are respectively disposed in corresponding mounting grooves 12 to improve the installation stability so that there is no need to provide additional space for the first magnets 71 and the second magnets 72.

In an embodiment, the lens driving device further includes at least two metal sheets 8, each of which is opposite to and spaced apart from the second magnet 72. The metal sheet 8 and the second magnet 72 magnetically attract each other.

In an embodiment, the metal sheets 8 include two metal sheets that respectively correspond to the two second magnets 72 to achieve an anti-shake restoring force.

In an embodiment, the lens driving device further includes Hall sensors 9 that are configured to detect the movement of the first support frame 1 about the first axis or the second axis and the movement of the lens module 20 along the optical axis.

In an embodiment, the Hall sensors 9 include two Hall sensors that are respectively disposed at coil centers of the two second coils 62 and are electrically connected to the second flexible printed circuit board 5 to realize electrical signal transmission.

In the lens driving device of the present disclosure, the first flexible printed circuit board 4 is disposed on the two adjacent sidewalls of the first support frame 1, then the second flexible printed circuit board 5 is disposed on the two adjacent sidewalls of the second support frame 2, and the first flexible printed circuit board 4 and the second flexible printed circuit board 5 are independently arranged and opposite to each other. Compared with the prior art, the two flexible printed circuit boards according to the present disclosure can be separately provided while meeting the requirements of double flexible printed circuit boards, which avoids the risk of welding disengagement and inoperability during the movement of the lens driving device. The folding portions 41 are provided on the first flexible printed circuit board 4 so that the movement of the lens module 20 can be buffered to prevent the first flexible printed circuit board 4 from being pulled by the movement of the lens module 20 to be damaged. The two sides of each folding portion 41 are respectively attached to the first support frame 1 and the shell 30, so that it is unnecessary to provide additional space for placing the folding portions 41 to reduce the occupied space for the folding portions 41 and facilitate product stacking in a multi-shot scenario.

The above description is merely some embodiments of the present disclosure, and is not intended to limit the present disclosure. Any modification, equivalent replacement and improvement made within the spirit and principle of the present disclosure shall be included within the scope of the present disclosure.

What is claimed is:

1. A lens driving device, comprising:
    a lens module;
    a first support frame configured to accommodate and carry the lens module;
    a second support frame sleeved on the first support frame and spaced apart from the first support frame;
    a support assembly configured to suspend the first support frame inside the second support frame in such a manner that the first support frame is rotatable relative to the second support frame about a first axis or a second axis, wherein the support assembly is rotatably connected to the first support frame along the first axis and rotatably connected to the second support frame along the second axis, and the first axis and the second axis are both perpendicular to an optical axis of the lens module;

a shell covering the second support frame;

a first flexible printed circuit board surrounding two adjacent sidewalls of the first support frame, wherein the first flexible printed circuit board comprises a plurality of folding portions that respectively correspond to the two adjacent sidewalls of the first support frame, wherein each of the folding portions comprises a first fixing portion attached to the first support frame, a second fixing portion attached to the shell, and a plurality of bent portions connecting the first fixing portion with the second fixing portion by bending, wherein the bent portions are compressed or stretched with a movement of the first support frame;

a second flexible printed circuit board surrounding another two adjacent sidewalls of the second support frame, wherein the second flexible printed circuit board and the first flexible printed circuit board are opposite to and independent from each other; and a driving assembly comprising a first driving assembly and a second driving assembly, wherein the first driving assembly is configured to drive the first support frame to rotate relative to the second support frame about the first axis or the second axis; the second driving assembly is configured to drive the lens module to move along the optical axis; and one of the first driving assembly and the second driving assembly is electrically connected to the first flexible printed circuit board, and another one of the first driving assembly and the second driving assembly is electrically connected to the second flexible printed circuit board.

2. The lens driving device as described in claim 1, wherein the support assembly comprises a support member, two first guiding posts, and two second guiding posts, wherein the support member comprises a support plate, two first support walls, and two second support walls, wherein the two first support walls are respectively bent and extend from two ends of the support plate along the first axis and are spaced apart from the first support frame; and the two second support walls are respectively bent and extend from two ends of the support plate along the second axis and are spaced apart from the first support frame;

the two first guiding posts are separately disposed at two ends of the first support frame along the first axis and spaced apart from each other, and the two second guiding posts are disposed at two ends of the first support frame along the second axis and spaced apart from each other;

the support plate is located on top of the lens module and spaced apart from the lens module; and the first support walls are rotatably connected to the first support frame through the two first guiding posts, respectively; and the second support walls are rotatably connected to the second support frame through the two second guiding posts, respectively, and are spaced apart from the first support frame.

3. The lens driving device as described in claim 1, wherein the first driving assembly comprises two first coils and two first magnets, wherein the two first coils are disposed on the first flexible printed circuit board along a direction perpendicular to the optical axis and respectively located at positions corresponding to the two adjacent sidewalls of the first support frame; and the two first magnets are respectively disposed at positions corresponding to the two adjacent sidewalls of the first support frame along the direction perpendicular to the optical axis; each of the two first magnets is opposite to and spaced apart from one of the two first coils, and one of the two first magnets and one of the two first coils jointly drive the first support frame to rotate relative to the second support frame about the first axis or the second axis; and the second driving assembly comprises two second coils and two second magnets, wherein the two second coils are disposed on the second flexible printed circuit board along the direction perpendicular to the optical axis and respectively located at positions corresponding to another two adjacent sidewalls of the first support frame; and the two second magnets are respectively disposed at positions corresponding to the another two adjacent sidewalls of the first support frame along the direction perpendicular to the optical axis; and each of the two second magnets is opposite to and spaced apart from one of the two second coils, and one of the two second magnets and one of the two second coils jointly drive the lens module to move along the optical axis.

4. The lens driving device as described in claim 1, wherein the first flexible printed circuit board further comprises:

a base portion disposed at a bottom end of the first support frame and connected to one of the first fixing portions located on one side of the first support frame;

a first connecting portion configured to connect one of the second fixing portions located on one side of the first support frame with another one of the first fixing portions located on another side of the first support frame; and a first extending portion extending from another one of the second fixing portions toward the shell.

5. The lens driving device as described in claim 1, wherein a fixing member is provided in a bent area of the bent portions to ensure a shape of the first flexible printed circuit board.

6. The lens driving device as described in claim 1, wherein the first support frame is provided with first attachment grooves at positions corresponding to the first fixing portions, and each of the first fixing portions is attached to one of the first attachment grooves.

7. The lens driving device as described in claim 1, wherein the second support frame is provided with avoidance portions at positions corresponding to the bent portions to avoid the bent portions.

8. The lens driving device as described in claim 1, wherein the second flexible printed circuit board comprises:

a plurality of third fixing portions respectively attached to two adjacent sides of the second support frame;

a second connecting portion configured to connect the third fixing portions located at the two adjacent sides of the second support frame; and a second extending portion extending from one of the third fixing portions toward the shell.

9. The lens driving device as described in claim 8, wherein the second support frame is provided with second attachment grooves at positions corresponding to the third fixing portions, and each of the third fixing portions is attached to one of the second attachment grooves.

10. The lens driving device as described in claim 1, wherein the bent portions comprise at least two bent portions, and the at least two bent portions are sequentially connected to each other and connects one of the first fixing portions with one of the second fixing portions.

* * * * *